(12) United States Patent
Kuroda (10) Patent No.: US 10,010,951 B2
(45) Date of Patent: Jul. 3, 2018

(54) END MILL AND METHOD OF MANUFACTURING MACHINED PRODUCT

(71) Applicant: KYOCERA Corporation, Kyoto-shi, Kyoto (JP)

(72) Inventor: Masahiko Kuroda, Higashiomi (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/114,237

(22) PCT Filed: Jan. 28, 2015

(86) PCT No.: PCT/JP2015/052365
§ 371 (c)(1),
(2) Date: Jul. 26, 2016

(87) PCT Pub. No.: WO2015/115484
PCT Pub. Date: Aug. 6, 2015

(65) Prior Publication Data
US 2017/0008098 A1 Jan. 12, 2017

(30) Foreign Application Priority Data
Jan. 28, 2014 (JP) ................................. 2014-013455

(51) Int. Cl.
*B23C 5/10* (2006.01)
(52) U.S. Cl.
CPC ........ *B23C 5/10* (2013.01); *B23C 2210/0492* (2013.01); *B23C 2210/241* (2013.01);
(Continued)
(58) Field of Classification Search
CPC . B23C 5/10; B23C 2210/483; B23C 2210/40; B23C 2210/282
See application file for complete search history.

(56) References Cited

U.S. PATENT DOCUMENTS 7,431,538 B1* 10/2008 Ni ............................. B23C 5/10
407/53
2002/0031409 A1 3/2002 Sato et al.
(Continued)

FOREIGN PATENT DOCUMENTS

EP 2730359 A1 5/2014
JP 62-188616 A 8/1987
(Continued)

OTHER PUBLICATIONS

JP 62-188616 A (Translation) obtained at http://dialog.proquest.com/professional/patents/lookuppatent?accountid=161361 (last visited May 18, 2017).*

(Continued)

*Primary Examiner* — Ryan Rufo
(74) *Attorney, Agent, or Firm* — Volpe and Koenig, P.C.

(57) ABSTRACT

An end mill includes a body including an axis, first cutting edges on a side of a front end of the body, second cutting edges at a rear side of the respective first cutting edges, flutes located along the second cutting edges, and heels located along the flutes. A shape of each of the flutes in a cross section includes a first concave curve on a side of the second cutting edges, a second concave curve on a side of the heels, and a protrusion located between the two concave curves, the protrusion includes two concave curves intersect each other, and a ratio of a distance from a circle including a maximum diameter in the body centered on the axis to a top of the protrusion to a distance H from the circle to the second cutting edge is 0.1 to 0.4.

7 Claims, 5 Drawing Sheets (52) U.S. Cl.
CPC .... *B23C 2210/282* (2013.01); *B23C 2210/40* (2013.01); *B23C 2222/04* (2013.01)

(56) References Cited

U.S. PATENT DOCUMENTS

| | | |
|---|---|---|
| 2006/0045637 A1 | 3/2006 | Flynn |
| 2006/0045638 A1* | 3/2006 | Flynn ................. B23C 5/10 407/53 |
| 2006/0067797 A1 | 3/2006 | Calamia |
| 2006/0188346 A1* | 8/2006 | Greenwood ........... B23C 5/003 407/54 |
| 2007/0201957 A1* | 8/2007 | Povich .................. B23C 5/10 407/53 |
| 2010/0209201 A1* | 8/2010 | Davis .................. B23C 5/10 407/60 |
| 2011/0085862 A1* | 4/2011 | Shaffer ................. B23C 5/10 407/54 |
| 2014/0119844 A1 | 5/2014 | Osawa et al. |

FOREIGN PATENT DOCUMENTS

| | | | |
|---|---|---|---|
| JP | 2000-288828 A | 10/2000 | |
| JP | 2004-122281 A * | 4/2004 | ............... B23C 5/10 |
| JP | 2006-110683 A | 4/2006 | |
| JP | 2008-511465 A | 4/2008 | |
| JP | 2011-110655 A | 6/2011 | |
| WO | 2006/028887 A1 | 3/2006 | |
| WO | WO 2008/132859 A1 * | 11/2008 | ............... B23C 5/10 |
| WO | 2013/005307 A1 | 1/2013 | |

OTHER PUBLICATIONS

JP 2004-122281 A (Translation) obtained at https://dossier1.j-platpat.inpit.go.jp/tri/all/odse/ODSE_GM101_Top.action (last visited May 18, 2017).*
International Search Report, PCT/JP2015/052365, dated Mar. 10, 2015, 2 pgs.

* cited by examiner

END MILL AND METHOD OF MANUFACTURING MACHINED PRODUCT

TECHNICAL FIELD

The present invention relates to an end mill and a method of manufacturing a machined product.

BACKGROUND ART

End mills are used for groove cutting or side cutting of a work, in this case chips generated by the cutting need to be smoothly discharged. For example, Patent Document 1 describes providing multiple breaker flutes of three or more on a rake surface to improve chip separation from the rake surface in order to cope with the problem that chip gets entangled with an end mill body to cause chip clogging when a work having high ductility such as aluminum system is machined.

RELATED ART DOCUMENT

Patent Document

Patent Document 1: Japanese Unexamined Patent Publication No. 2011-110655

SUMMARY OF THE INVENTION

Problems to be Solved by the Invention

However, the end mill having the shape with multiple breaker flutes disclosed in Patent Document 1 has a problem in that when the number of end cutting edges becomes three or more, the capacity of a chip discharging flute becomes small to reduce chip separation effects by the breaker flutes. Specifically, when cutting amount is increased, chips disadvantageously climb over the breaker flutes, so that the breaker flutes fail to function as a breaker, resulting in lowering of chip discharging performance to unfortunately shorten cutting length.

Means for Solving the Problems

An end mill of the embodiment includes an end mill body including a rotation center axis, three or more end cutting edges located at a front end side of the end mill body, peripheral cutting edges located at a rear side of the respective end cutting edges, chip discharging flutes located between corresponding two of the peripheral cutting edges, and heels located at respective opposite sides of the peripheral cutting edges to interpose a corresponding one of the chip discharging flutes therebetween. A cross sectional shape of each of the chip discharging flutes located between corresponding two of the peripheral cutting edges includes a first concave curve located on a side of a corresponding one of the peripheral cutting edges, a second concave curve located on a side of a corresponding one of the heels, and a protrusion located between the first concave curve and the second concave curve, the protrusion includes both sides lines of concave curves, and a ratio (h/H) of a distance h from a circle c including a maximum diameter capable of being drawn in the end mill body centered on the rotation center axis to a top of the protrusion to a distance H from the circle c to the peripheral cutting edge is 0.1 to 0.4 times.

Effects of the Invention

According to the end mill of the embodiment, two concave curved surfaces are located on the chip discharging flute such that the cross sectional shape of the chip discharging flute is formed of two concave curves, so that, in a multi-edge end mill including three or more end cutting edges and peripheral cutting edges continued therefrom, even when the capacity of the chip discharging flute is small, the surface including the two concave curves function as a breaker, resulting in good chip discharging performance. Furthermore, the high of the protrusion located between the two concave curves is 0.1 to 0.4 times of the depth of the chip discharging flute, so that no chip floats due to the protrusion to flatly contact to the end mill body, allowing chips to readily move away from the end mill body. In addition, the protrusion does not interfere the movement of a chip when the chip that has moved away moves in the rear side of the chip discharging flute of the end mill body, making it possible to suppress chip clogging even when a thick chip is generated with a large cutting amount. As a result, the cutting length can be lengthened.

EMBODIMENTS FOR CARRYING OUT THE INVENTION

DESCRIPTION OF EMBODIMENTS

Figure 2:
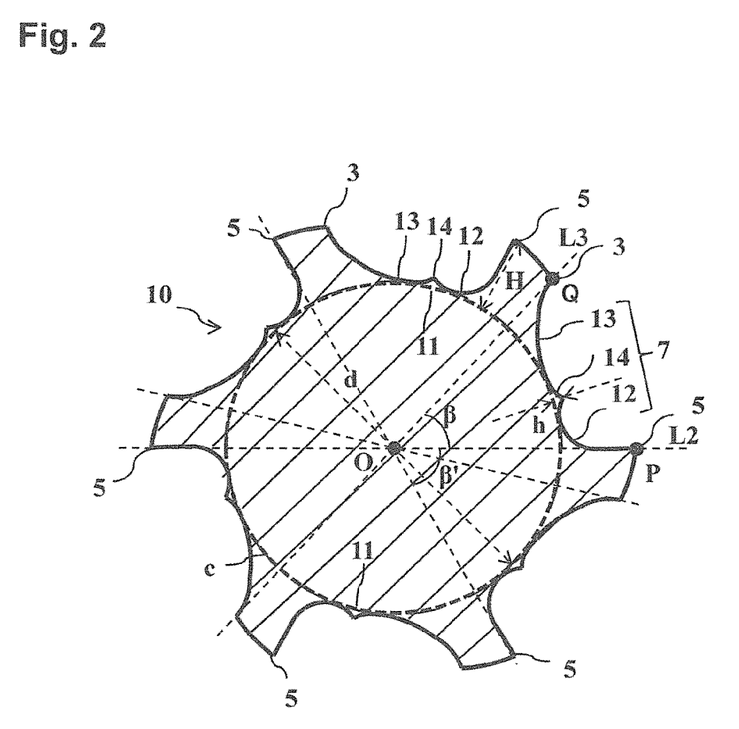
FIG. 2 is a cross sectional view perpendicular to a rotation center axis of the end mill at a position having chip discharging flutes of the end mill in FIG. 1.
Figure 3:
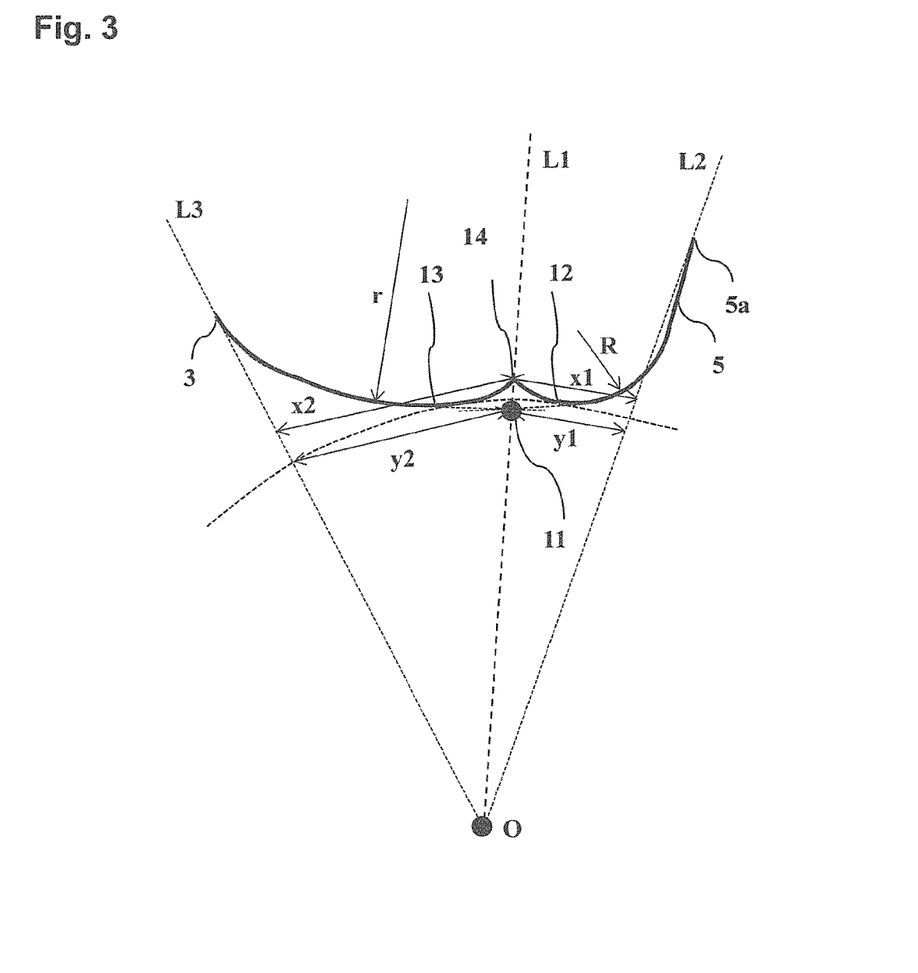
FIG. 3 is an enlarged view near a protrusion of the end mill in FIG. 2.
Figure 4:
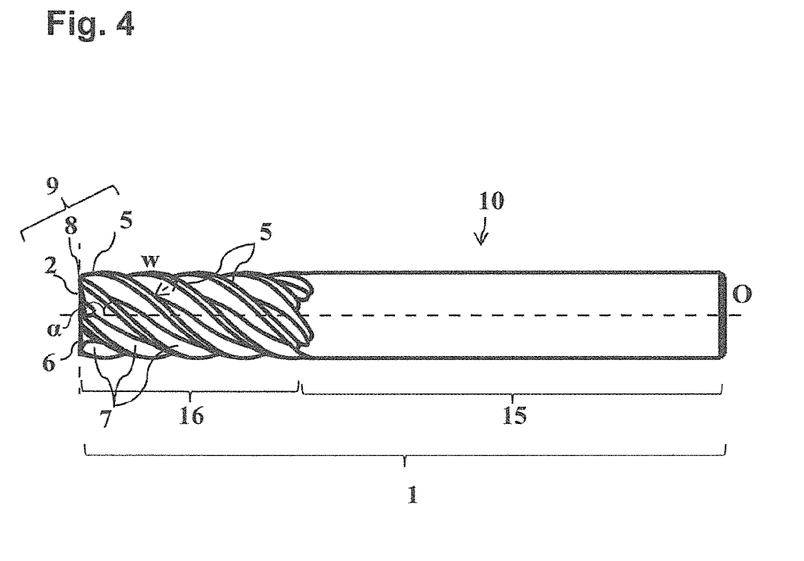
FIG. 4 is a side view of the end mill in FIG. 1.

An end mill 10 in FIGS. 1 to 4 is a solid end mill, and a portion including at least cutting edges 9 is formed of a hard material such as a cemented carbide, a cermet, or a cubic boron nitride (cBN). The end mill 10 is included an end mill body 1 having a substantially cylindrical shape having a diameter D centered on a rotational center axis O of the end mill 10. The end mill body 1 is, as shown in FIG. 4, formed of a shank portion 15 and a cutting edge portion 16. According to the front view of FIG. 1 viewed from the front end, the end mill 10 includes an end mill body 1 including the rotational center axis O, three or more (in FIG. 1, six) end cutting edges 2 located at the front end of the end mill body 1, chip discharging flutes 7 located from the respective end cutting edges 2 in a rotational direction of the end mill 10, and heels 3 located at respective opposite sides of peripheral ends of the end cutting edges 2 in the respective chip discharging flutes 7. According to the front view of FIG. 1 viewed from the front end, a tip flank surface 4 is located from each of the end cutting edges 2 in the inverse rotation direction. According to the embodiment, a high effect can be provided when the number of the end cutting edges 2 is four or more, specifically six or more and the capacity of each chip discharging flute 7 is small.

Figure 1:
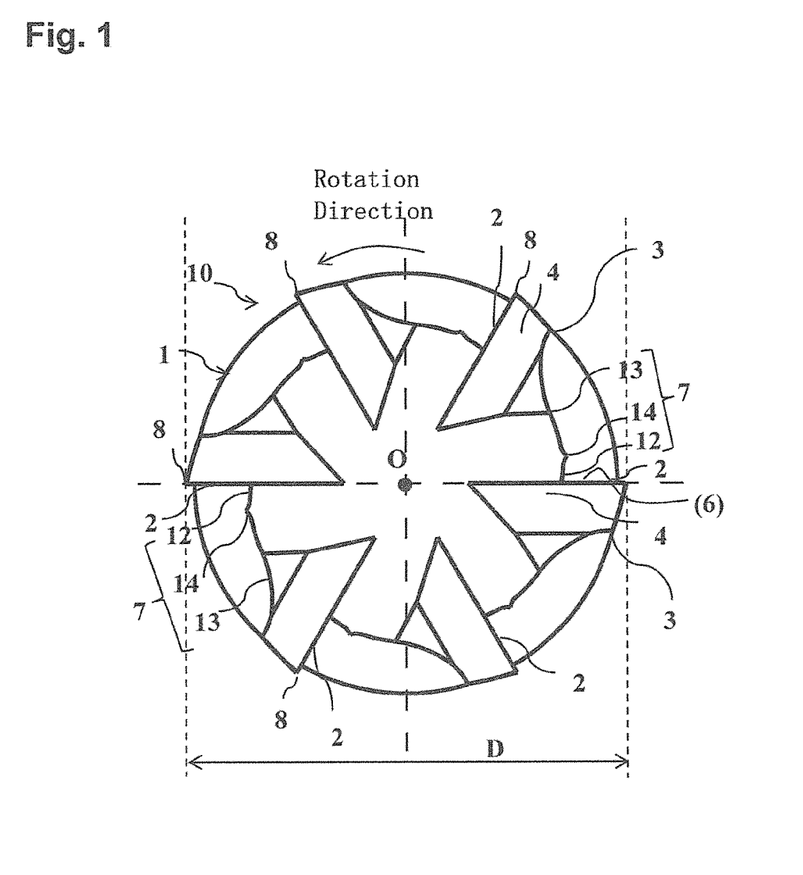
FIG. 1 is a front view of an example of an end mill of an embodiment when viewed from a front end side.

Furthermore, as shown in FIG. 4, the chip discharging flutes 7 are located at the peripheral of the end mill body 1 in a spiral manner by a predetermined length from the front end of the end mill body 1, and a peripheral cutting edge 5 located in the rear side of each of the end cutting edges 2 exists at a peripheral end of the corresponding one of the chip discharging flutes 7. The peripheral cutting edge 5 and the end cutting edge 2 are smoothly connected at a corner 8 to function as the cutting edge 9. Rake surfaces 6 having a flat surface shape are located between the respective chip discharging flutes 7 and the respective end cutting edges 2 by forming gashes. In FIG. 1, although the rake surface 6 cannot be seen, the position of the rake surface 6 is shown using a parenthesis. The intersecting both sides lines of the rake surface 6 and the tip flank surface 4 is the end cutting edge 2. Note that, in FIG. 4, the rotation center axis O is shown by a broken line.

As shown in FIG. 2 that is a cross sectional view perpendicular to the rotation center axis O at a position including the chip discharging flutes 7, the end mill 10 includes the peripheral cutting edges 5, the chip discharging flutes 7, and the heels 3 located at the respective opposite sides of the peripheral cutting edges 5 to interpose the corresponding one of the chip discharging flutes 7 therebetween.

In the embodiment, the cross sectional shape of each of the chip discharging flutes 7 located between corresponding two of the peripheral cutting edges 5 includes two concave curves that are a first concave curve 12 that is a concave curve located on the side of the peripheral cutting edge 5, and a second concave curve 13 located on the side of the heel 3, and a protrusion 14 located by the two concave curves as its both sides lines. That is, in the cross sectional shape of each chip discharging flute 7 located between corresponding two of the peripheral cutting edges 5, the tip of the protrusion 14 is located on a straight line that passes the rotational center axis O and a portion of the end mill body 1 where an extension of a curve on the side of the peripheral cutting edge 5 of the first concave curve 12 and an extension of a curve on the side of the heel 3 of the second concave curve 13 intersect. Thus, in the cross sectional view of FIG. 2, the both sides lines (surface shape of the protrusion 14) oriented from the top to the foot of the protrusion 14 are concave curves. That is, the chip discharging flute 7 includes two curved surfaces that are a first concave curved surface and a second concave curved surface, and the protrusion 14 whose both wall surfaces oriented from the top to the foot are the concave curved surfaces is located between the two curved surfaces. That is, the first concave curved surface, the second concave curved surface, and the protrusion 14 of the chip discharging flute 7 extend in a spiral manner from the termination of the rake surface 6 to the termination of the cutting edge portion 16. In a side view, the protrusion 14 is a projection, and is extended in a spiral manner. That is, the protrusion 14 continuously exists along the chip discharging flute 7. This allows chips to be smoothly discharged along the protrusion 14.

In addition, the ratio (h/H) of the distance h from the circle c including the maximum diameter capable of being drawn in the end mill body 2 centered on the rotation center axis O to the top of the protrusion 14 (corresponding to the high of the protrusion 14) to the distance H from the circle c to the peripheral cutting edge 5 (corresponding to the depth of the chip discharging flute 7) is 0.1 to 0.4. The desirable range of the ratio (h/H) is 0.1 to 0.3, and the notably desirable range of the ratio (h/H) is 0.1 to 0.2.

This range allows the surface including the two concave curves to function as a breaker even when the chip discharging flute 7 is small, resulting in good chip discharging performance. Moreover, with no chip floating due to the protrusion to flatly contact to the surface of the chip discharging flute 7 of the end mill body 1, chips allowed to readily move away from the end mill body 1. Furthermore, the protrusion does not interrupt the movement of chips when the chips moved away from the end mil body 1 move to the rear side of the chip discharging flute 7, making it possible to suppress chip clogging even when a thick chip is generated with large cutting amount.

Note that, the depth H of the chip discharging flute 7 is the length calculated by subtracting one half of the core thickness d (d/2) from the line length between the rotation center axis O and the peripheral cutting edge 5 in FIG. 2 that is a cross sectional view of the end mill 1. In FIG. 2, the core thickness d is the maximum diameter capable of being drawn in the end mill body 1 centered on the rotation center axis O of the end mill body 1, and is the diameter of the circle c passing the deepest point of the chip discharging flute 7. The high h of the protrusion 14 is the length calculated by subtracting one half of the length of the core thickness d (d/2) from the distance between the rotation center axis O and the top of the protrusion 14 in FIG. 2 that is a cross sectional view of the end mill 10.

In addition, according to the embodiment, the flat surface shaped rake surface 6 is located between the end cutting edge 2 and the chip discharging flute 7. That is, formation of the gash makes the rake surface 6 be the flat surface shaped rake surface 6, so that the first concave curve 12, the second concave curve 13, and the protrusion 14 are not located. This prevents formation of an irregularity continuing from the first concave curve 12, the second concave curve 13, and the protrusion 14 also at the end cutting edge 2. This suppresses increasing of cutting resistance at the end cutting edge 2, making it possible to suppress roughness of worked surface, chip clogging, and defect of the end cutting edge.

Herein, in the cross sectional view of FIG. 2, although the both sides lines oriented from the top to the foot of the protrusion 14 are concave curves formed of a part of the first concave curve 12 and the second concave curve 13, a flat surface other than the first concave curve 12 and the second concave curve 13 may exist at the top of the protrusion 14. Alternatively, the top may be a convex curved surface by polishing the flat surface by blast processing or the like. Regardless of the shape of the top, the foot portions of the protrusion 14 are concave curved surfaces. When the top of the protrusion 14 is a convex curved surface, it is preferable that the range of the convex curved surface be within 1/5 h from the top of the protrusion 14 with respect to the high h of the protrusion 14. That is it is preferable that the portion of the protrusion 14 being as high as 4/5 h from its bottom surface have the both sides lines that are concave curved lines.

According to the embodiment, the radius of curvature of the first concave curve 12 and the radius of curvature of the second concave curve 13 are not constant along the entire curved surface. The radius of curvature of a portion of the first concave curve 12, the portion being on the side of the peripheral cutting edge 5 from the deepest point of the first concave curve 12 in contact with the circle c determining the core thickness d, is different form the radius of curvature of a portion of the first concave curve 12, the portion being on the side of the protrusion 14 from the deepest point of the first concave curve 12 in contact with the circle c determining the core thickness d. The radius of curvature of a portion of the second concave curve 13, the portion being on the side of the heel 3 from the deepest point of the second concave curve 13 in contact with the circle c determining the core thickness d, is also different form the radius of curvature of a portion of the second concave curve 13, the portion being on the side of the protrusion 14 from the deepest point of the second concave curve 13 in contact with the circle c determining the core thickness d. According to the embodiment, the radius of curvature of the curve on the side of the protrusion 14 is small in both of the first concave curve 12 and the second concave curve 13. Note that any of the curves is a concave curve. According to the embodiment, the radius of curvature of the curve closest to the side of the peripheral cutting edge 5 of the first concave curve 12 is smaller than the radius of curvature of the curve closest to the side of the heel 3 of the second concave curve 13. This structure allows chips generated at the peripheral cutting edge 5 to readily move away from the end mill body 1 due to the protrusion 14, and suppresses the cutting resistance from becoming too large. Furthermore, this structure suppresses the thickness on the side of the heel 3 of the chip discharging flute 7 from becoming small, suppressing the heel 3 from being defective.

Furthermore, the position of the protrusion 14 can be changed by changing the radius of curvatures of the first concave curve 12 and the second concave curve 13. According to the embodiment, the protrusion 14 is located on a straight line L1 that passes the rotation center axis O and a flute bottom 11 in the cross sectional shape. As shown in FIG. 3, the flute bottom 11 is a portion where an extension of a curved surface on the side of the peripheral cutting edge 5 of the first concave curve 12, and an extension of a curved surface on the side of the heel 3 of the second concave curve 13 intersect. That is, the flute bottom 11 is the point where the extension of the curve on the side of the peripheral cutting edge 5 of the first concave curve 12 (curve having the radius of curvature R in FIG. 3), and the extension of the curve on the side of the heel 3 of the second concave curve 13 (curve having the radius of curvature r in FIG. 3) intersect. Then, provided that the straight line passing a peripheral end 5a of the peripheral cutting edge 5 and the rotation center axis O is L2, and the straight line passing the heel 3 and the rotation center axis O is L3, the ratio between the distance x1 from the straight line L2 to the tip of the protrusion 14 and the distance x2 from the straight line L3 to the tip of the protrusion 14 is the same as the ratio between the distance y1 from the straight line L2 to the flute bottom 11 and the distance y2 from the straight line L3 to the flute bottom 11.

Thus, the protrusion 14 is not located on the side of the rake surface 6 as compared with the flute bottom 11, so that the chips generated at the peripheral cutting edge 5 do not collide with the protrusion 14 at an early stage, suppressing the cutting resistance from becoming too large. Furthermore, the protrusion 14 is not located on the side of the heel 3 as compared with the flute bottom 11, suppressing the chips from remaining in the chip discharging flute 7 for a long time. This makes it possible to stably discharge chips.

Furthermore, in the cross section perpendicular to the rotation center axis O at the position including the chip discharging flute 7 as shown in FIG. 2, the core thickness d is 0.5 to 0.8 times of the diameter D of the end mill 10. The strength of the end mill 10 is high in this range, making it possible to suppress breakage of the end mill 10. Note that the core thickness d is defined as the diameter of the largest circle c that can be drawn at the center portion of the end mill 10, and is equal to the distance between the deepest points of the chip discharging flutes 7.

Furthermore, although the desirable range of the opening angle β of the chip discharging flute 7 is changed depending on the number of the cutting edges 9, the desirable range is 30° to 60° in the case where the number of the cutting edges 9 is six as shown in FIG. 2. This range suppresses chips from clogging in the chip discharging flute 7, and suppresses a chip from being curled by the chip discharging flute 7 and flying out of the chip discharging flute 7. Note that the opening angle β of the chip discharging flute 7 is defined by the angle between the straight line L2 (shown by a broken line) connecting the outer periphery end P on the side of the cutting edge 9 of the chip discharging flute 7 and the rotation center axis O, and the straight line L3 (shown by a broken line) connecting the outer periphery end Q that is the heel 3 of the chip discharging flute 7 and the rotation center axis O in FIG. 2.

In the embodiment, the helix angle α of the peripheral cutting edge 5 is 30° to 45°. This range of the angle reduces the component of cutting resistance in the direction perpendicular to the rotation center axis O, yielding an effect of reducing the load to the tool. The pitch (distance) w between the adjacent peripheral cutting edges 5,5 when viewed from the front end side is 0.25 to 0.5 times of the diameter D of the end mill 10. According to the embodiment, a good chip discharging performance can be exerted even when the chip discharging flute 7 is narrow in this manner. The helix angle α of the peripheral cutting edge 5 is defined by the angle between the rotation center axis O and the peripheral cutting edge 5 in a side view of the end mill 10.

In the embodiment, at least one of the plurality of cutting edges 9 is unequally divided to have a non-point symmetric shape with respect to the other cutting edges 9. That is, the shape of at least of one of the cutting edges 9 has an asymmetric shape with respect to the shape of the other cutting edges 9, leading to sympathetic vibration of the end mill 10 during cutting and making it possible to suppress generation of chattering. An example of the asymmetric shape of at least one of the cutting edges 9 includes a different shape (unequal division) in the opening angle β of some of the chip discharging flutes being different from the opening angle β' of the other chip discharging flutes 7. Another example of the asymmetric shape of at least one of the cutting edges 9 includes a shape (unequal lead) in which the helix angle α is changed.

In the embodiment, in the end mill 10 having an unequal division shape, the ratio (x1/x2) between the length x1 of the first concave curve 12 and the length x2 of the second concave curve 13 in some of the chip discharging flutes 7 (opening angle β) is 0.9 to 1.1 times of the ratio (x1/x2) in the other chip discharging flutes 7 (opening degree angle β') in the cross sectional shape of each chip discharging flute 7 located between the corresponding peripheral cutting edges 5. That is, the position of the protrusion 14 in some of the chip discharging flutes 7 have substantially similarity relationship with respect to the position of the protrusion 14 of the other chip discharging flutes 7. A different opening angle in some of the chip discharging flutes 7 in this manner suppresses the chip discharging performance of some of the chip discharging flutes 7 from being readily lowered as compared with the chip discharging performance of the other chip discharging flutes 7, improving the total chip discharging performance of the end mill 10.

In the end mill 10 according to the embodiment, the cutting edge is capable of being regenerated by repolishing the cutting edge. Specifically, the end cutting edge 2 and the peripheral cutting edge 5 can be regenerated by repolishing the chip discharging flute 7 and repolishing the gash of the rake surface 6.

<Method of Manufacturing Machined Product>

A method of manufacturing a machined product according to the embodiment is described with reference to FIGS. 5A to 5C.

Figure 5:
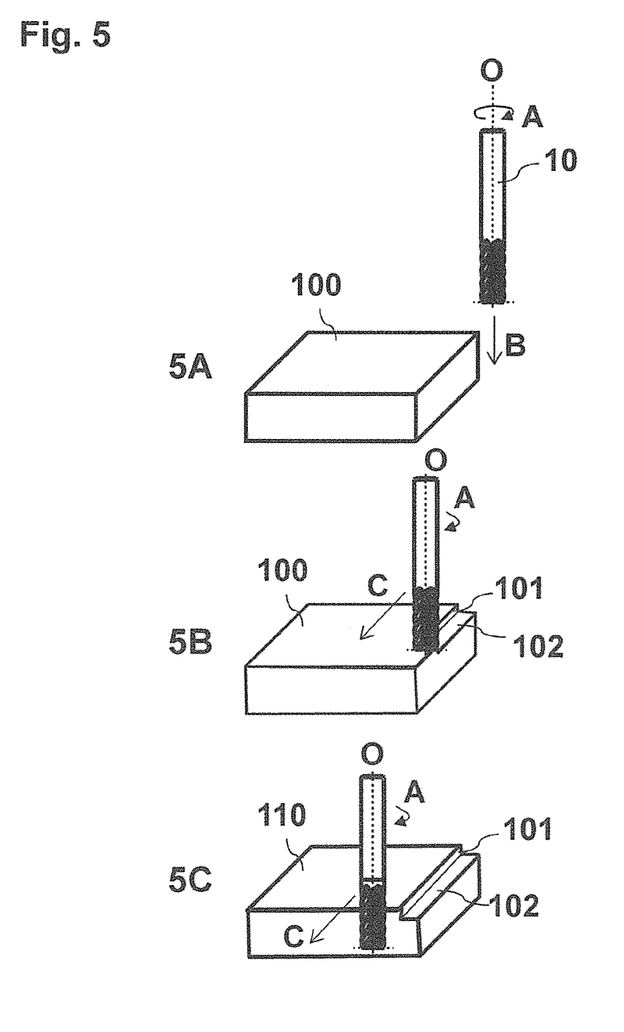
FIG. 5 is a schematic view showing a method of manufacturing a machined product for cutting a workpiece by using the end mill in FIGS. 1 to 4.

In the embodiment, the end mill 10 attached to an arbor (not shown) is moved in the direction of the arrow B while being rotated about the rotation center axis O of the end mill 10 in the direction of the arrow A to come close to a workpiece 100 as shown in FIG. 5A.

Next, as shown in FIG. 5B, the end cutting edge 2 and the peripheral cutting edge 5 of the end mill 10 being rotating are made contact with a surface of the workpiece 100. Specifically, the end mill 10 being rotating is made to move in the direction of the arrow C perpendicular to the rotation center axis O to make the end cutting edge 2 and the peripheral cutting edge 5 contact with the surface of the workpiece 100. A surface to be cut of the workpiece 100 is cut by being made contact with mainly the peripheral cutting edge 5 among the cutting edge in this manner to form a cut surface 101. Furthermore, a portion of the surface to be cut of the workpiece 100 cut by the end cutting edge 2 becomes a chip to be removed from the processing portion, and the exposed flat surface of the workpiece 100 becomes a finished surface 102.

When the cutting processing is finished, as shown in FIG. 5C, the end mill 10 is moved in the direction of the arrow C without change to move the end mill 10 away from the workpiece 100, yielding a desired machined product 110. The end mill 10 has excellent cutting capabilities because of the above reasons, making it possible to yield the machined product 110 excellent in processed surface accuracy.

Note that, when the cutting processing is continued, the process is repeated for making the cutting edge 5 of the end mill 10 contact with a different portion of the workpiece 100 while keeping the state of rotating the end mill 10. In the embodiment, the end mill 10 is made to come close to the workpiece 100, but making the end mill 10 and the workpiece 100 relatively close is sufficient, thus for example, the workpiece 100 may be made close to the end mill 10. The same applies to the process for moving the end mill 10 away from the workpiece 100.

The preferable embodiment of the invention is described above, but the invention is not limited to the above embodiment, and it goes without saying that the invention can be applied in any manner as long as not departing from the gist of the invention.

EXAMPLES

End mills are prepared that were formed of an end mill body made of a cemented carbide, that had a hard layer of (TiAl)N system coated thereon, and that had the shape having the radius of curvature (mm) on the side of the peripheral cutting edge of the first concave curve, the radius of curvature (mm) on the side of the heel of the second concave curve, the position of the top of the protrusion with respect to the straight line passing the rotation center axis O and the flute bottom, and the ratio (h/H) of the high h of the protrusion to the depth H of the chip discharging flute as shown in Table 1. Note that each sample had six edges, and D=8 mm, d=5.4 mm, and w=2.8 mm.

As for samples Nos. 1 to 12, $\alpha$=42°, 43°, 44° (unequal lead shape in which the helix angle $\alpha$ was different in each of the pairs of opposing peripheral cutting edges among six peripheral cutting edges), and $\beta$=63°, 56°, 51°. At this time, as for samples Nos. 4 to 10, the ratio (x1/x2) between the length x1 of the first concave curve and the length x2 of the second concave curve in the chip discharging flutes having the opening angle $\beta$=63°, 51° were set to 0.9 to 1.1 times of the ratio (x1/x2) in the chip discharging flutes having the opening angle $\beta$=56°. As for sample No. 13, $\alpha$=43° (equal lead shape in which all helix angles $\alpha$ were the same), and $\beta$=60° (equal division shape in which all opening angle $\beta$ were the same).

Furthermore, as for samples Nos. 1 to 11 and No. 13, a gash was located to have a shape in which a rake surface having a flat surface shape was located between the end cutting edge and the chip discharging flute. As for sample No. 12, no gash was located between the end cutting edge and the chip discharging flute to have a shape in which no rake surface having a flat surface shape was located between the end cutting edge and the chip discharging flute.

Note that, in the Table, the relation between the tip of the protrusion and the flute bottom is indicated in the item of protrusion position. Specifically, the item of protrusion position describes flute bottom as for the sample in which the tip of the protrusion was located at the position on the straight line L1 (the straight line passing the flute bottom and the rotation center axis, the flute bottom being a portion where the extension of the curved surface on the side of the peripheral cutting edge of the first concave curve, and the extension of the curved surface on the side of the heel of the second concave curve intersect), describes rake surface side as for the sample in which the tip of the protrusion was located at a position on the side of the rake surface with respect to the straight line L1, and describes flank surface side as for the sample in which the tip of the protrusion was located at a position on the side of the flank surface with respect to the straight line L1. Furthermore, as for sample No. 3, the protrusion side of the first concave curve and the protrusion side of the second concave curve were processed to be a convex curved surface, and the both sides lines of the protrusion were convex curves in cross section.

Then, the performance of the end mill was evaluated in accordance with the cutting conditions described below. Results are shown in Table 1.

(Cutting Conditions)

workpiece: SUS304 machining diameter: φ8 mm machining speed: 83 m/min rotation number: 3300 rotation/min feed: 0.035 mm/edge cutting depth: 5 mm cutting width: 3 mm cutting type: shoulder processing cutting environment: wet cutting evaluation items: cutting length and state of end mill after processing

TABLE 1

| | Chip discharging flute | | | | Cutting performance | |
|---|---|---|---|---|---|---|
| Sample No | Radius of curvature of first concave curve mm | Radius of curvature of second concave curve mm | Position of protrusion | Ratio of height of protrusion h/H | Cutting length (m) | Condition after cutting |
| 1 | 1.0 (one curve) | — | — | — | 25 | Chipping at end cutting edge |
| 2 | 0.7 | 1.63 | Rake surface side | 0.2 | 39 | Normal wear |
| 3 | 0.85* | 1.5* | Flute bottom | 0.3 | 20 | Defect of peripheral cutting edge |
| 4 | 0.85 | 1.5 | Flute bottom | 0.6 | 11 | Breakage |
| 5 | 0.85 | 1.5 | Flute bottom | 0.4 | 40 | Normal wear |
| 6 | 0.85 | 1.5 | Flute bottom | 0.2 | 45 | Normal wear |
| 7 | 0.85 | 1.5 | Flute bottom | 0.1 | 42 | Normal wear |
| 8 | 0.85 | 1.5 | Flute bottom | 0.01 | 22 | Chipping at end cutting edge |
| 9 | 0.5 | 1.87 | Rake surface side | 0.3 | 37 | Normal wear |
| 10 | 1.45 | 0.89 | Flank surface side | 0.3 | 40 | Slight chipping at peripheral cutting edge |
| 11 | 1.1 | 1.1 | Flute bottom | 0.3 | 38 | Normal wear |
| 12** | 0.85 | 1.5 | Flute bottom | 0.1 | 28 | Normal wear |
| 13** | 0.85 | 1.5 | Flute bottom | 0.2 | 32 | Normal wear |

*Curved surface of sample No. 3 had the protrusion having both sides lines of convex curves.
**Sample No. 12 had a shape having no rake surface having a flat surface shape between end cutting edge and chip discharging flute.
***Sample No. 13 had an equal lead and an equal division shape in which $\alpha = 43°$, $\beta = 60°$.

As shown in Table 1, in sample No. 1 having the chip discharging flute formed of one concave curve and located with no protrusion, chip discharging performance was bad, chips tended to be clogged, and cutting length was short. In sample No. 3 having the protrusion having convex curved surfaces, chips were flown out of the chip discharging flute to be bitten by the peripheral cutting edge, causing defects of the peripheral cutting edge. In sample No. 4 having a ratio (h/H) of the height h of the protrusion to the depth H of the chip discharging flute of more than 0.4 times, the protrusion became an obstacle to a discharge of chips, and then chip was clogged, and the end mill was broken. In sample No. 8 having a ratio (h/H) of not more than 0.1 times, chips flatly contacted to the end mill body, so that chips tended to be clogged, so that chipping occurred at the end cutting edge and cutting length was short.

In contrast, in samples Nos. 2, 5 to 7, and 9 to 13 in which the cross section of each chip discharging flute had two concave curves that are the first concave curve located on the side of the peripheral cutting edge and the second concave curve located on the side of the heel, and the protrusion located to have the two concave curves as its both sides lines, and in which the ratio h/H was 0.1 to 0.4 times, the cutting length was long and not less than 28 m.

Specifically, in samples Nos. 2, 5 to 7, and 9 to 11 that had the rake surface having a flat surface shape between the end cutting edge and chip discharging flute, and that had the chip discharging flute having an unequal division shape and an unequal lead shape, the cutting length was long and not less than 37 m.

In particular, in samples Nos. 5 to 7 in which the tip of the protrusion was located on the straight line L1 (the protrusion position in Table 1 was the flute bottom), and in which the radius of curvature on the side of the peripheral cutting edge of the first concave curve was smaller than the radius of curvature on the side of the heel of the second concave curve, chip discharging performance was good, and the cutting length was long and not less than 40 m.

REFERENCE SIGNS LIST

1: end mill body
2: end cutting edge
3: heel
4: tip flank surface
5: peripheral cutting edge
6: rake surface
7: chip discharging flute
8: corner
9: cutting edge
10: end mill
11: flute bottom
12: first concave curve
13: second concave curve
14: protrusion
15: shank portion
16: cutting edge portion
O: rotation center axis
D: diameter of end mill
H: depth of chip discharging flute
h: height of protrusion
$\alpha$: helix angle
$\beta$: opening angle
c: the maximum circle that can be drawn at the center portion of the end mill in the cross section perpendicular to the rotation center axis at a position including the chip discharging flute
d: core thickness

The invention claimed is:
1. An end mill comprising:
a body having a rotation center axis;
three or more first cutting edges located at a front end side of the body;
second cutting edges extending rearwardly in an axial direction from the respective first cutting edges;
flutes located along the respective second cutting edges;
heels located both along the respective flutes and at a front of the respective flutes in a rotation direction of the rotation center axis; and
rake surfaces located between the respective first cutting edges and the respective flutes, wherein
a cross sectional shape of each of the flutes comprises a first concave curve located on a side of a corresponding one of the second cutting edges, a second concave curve located on a side of a corresponding one of the heels, and a protrusion located between the first concave curve and the second concave curve, the first concave curve, the second concave curve and the protrusion are spaced apart from the respective first cutting edges, the protrusion comprises two concave curves intersecting each other, a ratio h/H of a distance h from a circle c comprising a maximum diameter capable of being drawn in the body to a top of the protrusion and a distance H from the circle c to the second cutting edge is 0.1 to 0.4 in a cross sectional view perpendicular to the rotation center axis of the body, the circle c is centered on the rotation center axis of the body, and the first concave curve and the second concave curve are both in direct contact with the circle c.

2. The end mill according to claim 1, wherein the rake surfaces have flat shape.

3. The end mill according to claim 1, wherein a tip of the protrusion is located on a straight line that passes the rotation center axis and a portion of the body where an extension of a curved surface on the side of the second cutting edge of the first concave curve and an extension of a curved surface on the side of the heel of the second concave curve intersect in the cross sectional shape.

4. The end mill according to claim 1, wherein a radius of curvature on the side of the second cutting edge of the first concave curve is smaller than a radius of curvature on the side of the heel of the second concave curve in the cross sectional shape.

5. The end mill according to claim 1, wherein the flutes comprise a first flute and a second flute, an opening angle of the first flute is different from an opening angle of the second flute in the cross sectional shape.

6. The end mill according to claim 5, wherein a ratio x1/x2 between a length x1 of the first concave curve and a length x2 of the second concave curve in the first flute is defined as a first ratio, a ratio x3/x4 between a length x3 of the first concave curve and a length x4 of the second concave curve in the second flute is defined as a second ratio, and the first ratio is 0.9 to 1.1 times of the second ratio.

7. A method of manufacturing a machined product, comprising:

rotating an end mill according to claim 1;

bringing the first cutting edges and the second cutting edges of the end mill being rotated into contact with a workpiece; and separating the end mill from the workpiece.

* * * * *